Figure 1:
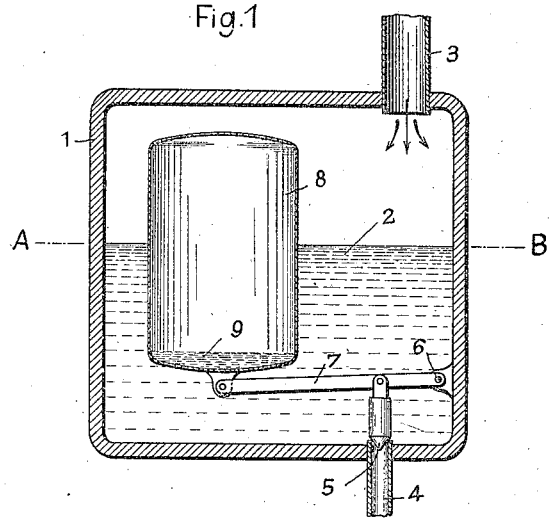

Patented Oct. 2, 1923.

1,469,647

UNITED STATES PATENT OFFICE.

EDUARD RUEGGER, OF ZURICH, SWITZERLAND.

HOLLOW INCLOSED FLOAT.

Application filed January 27, 1920. Serial No. 354,507.

*To all whom it may concern:*

Be it known that I, EDUARD RUEGGER, a citizen of the Republic of Switzerland, residing at Zurich, Hardturmstrasse 19, Switzerland, have invented certain new and useful Improvements in a Hollow Inclosed Float adapted for use in devices for controlling liquid mediums, especially in refrigerating machines; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

Floats of devices for controlling liquids which are used especially with refrigerating machines, must have a comparatively large displacement volume whilst, however, their masses should be as small as possible in order to act quickly and reliably upon small variations of the level of the liquid and yet not cause any variations. For this purpose the floats have been constructed hollow and with a very thin shell. But in the case of such a float having to work in a chamber with a pressure considerably above atmospheric, the danger exists, that the shell of the float is bulged-in by that external pressure.

The object of the present invention is to construct a float which, whilst having a displacement volume as large as possible, is as light as possible and therefore its mass is as small as possible.

According to the invention the float is to the greatest part filled with a gas other than air the pressure of which is above atmospheric at a temperature of 20° centigrade and which pressure varies with a varying temperature in the same sense and proportion as the pressure of the liquid to be controlled. The medium to fill the empty space of the float may be of such a nature and of such a quantity that it is at least in the lower part of the range of the working temperatures partly in a liquid state.

The medium is of such a kind that the vapor or gas resulting therefrom has a greater pressure than the vapor or gas resulting from the liquid medium to be controlled when the device is working. Furthermore a mixture of a liquid and a gas other than air that is absorbed by the liquid may be used for filling the float. Such mixtures, as for instance water and ammonia are easily filled in. Their pressure rise takes place in the same manner as with saturated steam.

The qualities and advantages of the object of the invention will be entered on when explaining the drawing.

Figure 2:
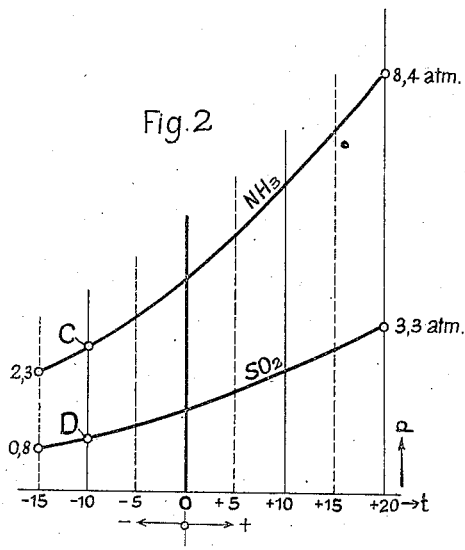

In the drawing:

Fig. 1 represents a section through a floating device shown diagrammatically and Fig. 2 a diagram of two mediums, one of which may represent the medium to be controlled and the other the filling medium for the float or vice versa.

In Fig. 1, 1 denotes a chamber of rectangular vertical cross-section, partly filled with the liquid to be controlled. This liquid flows into the chamber from above by means of a pipe 3 and a pipe 4 conducts the liquid away. The entrance opening of pipe 4 is to be controlled by means of valve 5 in such a way, that the level of the liquid in the chamber 1 remains constantly at a height A—B. To that end the valve 5 is connected to a float 8 by means of a lever 7 pivoted on a pin 6. The shell of the float is very thin and the float is filled to the smaller part with a liquid 9 containing a gas other than air absorbed in it and to the greater part with the vapour arising from the liquid. The part of the chamber above the level A—B is filled with the vapour formed from the liquid to be controlled. If this vapour would have a much greater pressure than that which exists inside the float 8 the danger would exist that the shell of that float would be bulged-in by the additional pressure. According to the invention a medium is chosen to fill the float 8 with, the pressure of which, when the float is enclosed and at a temperature of 20° centigrade, is above atmospheric.

In Fig. 2 the saturation lines of two different mediums used with refrigerating machines are shown. The abscissa of the diagram is the temperature "t" and the ordinate the absolute pressure "p". The lower curve is the saturation line of sulphurous acid $SO_2$, the upper curve that of ammonia $NH_3$. In the first instance $NH_3$ shall be chosen as the medium to be controlled and $SO_2$ as the medium to fill the float with; in this case the absolute pressure inside the float on being filled is 3,3 atmospheres at a temperature of 20° centigrade. Assuming that during the working period the temperature of the ammonia to be controlled and that inside the float sinks down to a stationary temperature —10° centigrade, the shell of the float has to stand an external pressure of approximately 2,8 atm. (point C in Fig. 2) and an internal pressure of approximately 1,0 atm. (point D in Fig. 2), therefore a surplus external pressure of 2,8—1,0=1,8 atm. The shell of the float must be of such a thickness that it will stand this surplus pressure with a reasonable factor of safety. If, on the other hand, the float is filled with $NH_3$ instead of $SO_2$, that is to say with the same medium as is contained in the chamber 2 and if such an amount of liquid $NH_3$ is filled inside the float from the beginning, that the liquid does not evaporate totally under working conditions, so that there is always saturated $NH_3$ vapour present inside the float, the pressure on both sides of the walls of the float will be the same and the shell is relieved from a one-sided pressure.

As long as a liquid medium is present inside the float the pressure will rise according to the saturation line with a rising temperature. The consequence of a further rise of temperature is the evaporation of all the liquid and the formation of superheated vapour inside the float, whilst there is still a state of saturation outside the float, therefore the outside pressure will rise more than the inside pressure but the pressure difference will not be considerable and not dangerous for the shell of the float, as the latter cannot be taken too thin for manufacturing reasons.

In the third case the float may be filled to a smaller part with liquid $NH_3$ and to the greater part with vaporous $NH_3$, the liquid to be controlled and contained in the chamber 1 being sulphurous acid $SO_2$. At a stationary temperature of —10° centigrade the pressure in the chamber is 1,0 atm. (point D in Fig. 2) and the pressure inside the float 2,8 atm. (point C in Fig. 2). The shell of the float is exposed to an internal surplus pressure of 1,8 atm. In this third case an internal surplus pressure is still maintained if the working- or stationary temperature varies between +20° and —15°. It is a well known fact that hollow bodies will stand an internal pressure better than an external, therefore the third case gives a large factor of safety with regard to the strength of the shell of the float even if its thickness and the whole weight of the float are, as it is desired, very small.

I claim:

1. A hollow closed float for controlling the flow of freezing liquid and a liquid therein that will volatilize at temperatures lower than the volatilizing temperature of the freezing liquid to be controlled, whereby the pressure within the float will be greater than that outside the float under all conditions of operation.

2. A hollow closed float of a device for controlling liquid mediums, especially in refrigerating machines, comprising a thin shell-like enclosed body and a liquid medium within said enclosed body the pressure of the vapor of which varies at varying temperatures in the same sense as the pressure of the medium to be controlled and is at all operating temperatures greater than the pressure of the medium to be controlled.

3. A hollow closed float for controlling liquid freezing mediums, comprising a closed body made of a thin shell and in said body a medium which consists of a liquid containing a gas other than air absorbed in the liquid and producing a pressure above the gas pressure surrounding the float at all operative temperatures of the liquid to be controlled.

In testimony that I claim the foregoing as my invention I have signed my name.

EDUARD RUEGGER.